(12) United States Patent
Suetsugu et al.

(10) Patent No.: US 7,522,803 B2
(45) Date of Patent: Apr. 21, 2009

(54) PROCESS FOR PRODUCING OPTICAL DEVICE

(75) Inventors: Tatsuya Suetsugu, Osaka (JP); Norimasa Kominami, Osaka (JP); Takeshi Ohtani, Osaka (JP); Naoko Kaga, Osaka (JP); Hiroaki Yokoi, Osaka (JP); Minoru Takada, Osaka (JP); Takashi Tarumi, Osaka (JP); Toshihiko Einishi, Osaka (JP); Kohei Kadono, Ikeda (JP)

(73) Assignees: Isuzu Glass Co., Ltd., Osaka (JP); National Institute of Advanced Industrial Science and Technology, Tokyo (JP)

( * ) Notice: Subject to any disclaimer, the term of this patent is extended or adjusted under 35 U.S.C. 154(b) by 317 days.

(21) Appl. No.: 10/589,720

(22) PCT Filed: Feb. 15, 2005

(86) PCT No.: PCT/JP2005/002246

§ 371 (c)(1),
(2), (4) Date: Aug. 17, 2006

(87) PCT Pub. No.: WO2005/080284

PCT Pub. Date: Sep. 1, 2005

(65) Prior Publication Data

US 2008/0226248 A1      Sep. 18, 2008

(30) Foreign Application Priority Data

Feb. 20, 2004   (JP)   ............................. 2004-044734

(51) Int. Cl.
G02B 6/10   (2006.01)

(52) U.S. Cl. .................... 385/132; 65/30.13; 65/386; 385/124; 385/142

(58) Field of Classification Search ................... 385/33, 385/34, 37, 124, 129, 131, 132, 142; 65/386, 65/30.13
See application file for complete search history.

(56) References Cited

U.S. PATENT DOCUMENTS 3,997,312 A      12/1976   Besselink et al.

(Continued)

FOREIGN PATENT DOCUMENTS

JP      A-61-256946      11/1986

(Continued)

OTHER PUBLICATIONS

Masayuki Yamane et al., "Glass Kogaku Handbook", 1st Edition, Jul. 5, 1999, p. 16, table 2.14 (Cited in the International Search Report mailed on May 10, 2005 during the international phrase of PCT/JP2005/02246 application.).

Primary Examiner—Sung H Pak
Assistant Examiner—Daniel Petkovsek
(74) Attorney, Agent, or Firm—Posz Law Group, PLC

(57) ABSTRACT

The present invention provides a method of producing an optical element without the need for high vacuum, unlike the thin film deposition methods, and without using a molten salt. More specifically, the invention provides a method of producing an optical element comprising applying a paste containing at least one compound selected from lithium compounds, potassium compounds, rubidium compounds, cesium compounds, silver compounds, and thallium compounds, an organic resin, and an organic solvent to a glass substrate containing an alkali metal component as a glass component and then performing heat treatment at a temperature below the softening temperature of the glass substrate.

8 Claims, 8 Drawing Sheets

U.S. PATENT DOCUMENTS

| | | | | |
|---|---|---|---|---|
| 4,057,408 A | * | 11/1977 | Pierson et al. | 65/30.13 |
| 4,285,988 A | * | 8/1981 | Ernsberger | 205/122 |
| 6,876,796 B2 | * | 4/2005 | Garito et al. | 385/50 |
| 2005/0152657 A1 | | 7/2005 | Suetsugu et al. | |

FOREIGN PATENT DOCUMENTS

| | | |
|---|---|---|
| JP | A-4-181201 | 6/1992 |
| JP | A-2000-103646 | 4/2000 |
| JP | A-2003-131028 | 5/2003 |

* cited by examiner

PROCESS FOR PRODUCING OPTICAL DEVICE

TECHNICAL FIELD

The present invention relates to a process for producing an optical element, and particularly a process for producing an optical element comprising a glass having a different refractive index region in at least a portion thereof.

BACKGROUND ART

In the field of optical communications, optical fiber collimators are conventionally used to emit signal light, which has been transmitted through an optical fiber, in the form of parallel light from the optical fiber, or in reverse, used to converge parallel light on one end surface of an optical fiber to cause the light to enter the optical fiber. When using such an optical fiber collimeter, interposition of an optically functional element (for example, an optical filter, optical isolator, optical switch, optical modulator, etc.) between a pair of collimator lenses can provide a desired effect on the signal light transmitted through a single mode optical fiber at the light-entering side and then converge the signal light so as to further transmit the light to a single mode optical fiber at the light-receiving side.

Various forms of lenses have been used as collimating lenses for optical fiber collimators. However, cylindrical graded refractive index lenses (also referred to as "rod lenses" or "GRIN lenses") are generally used because of their ease of polishing and like processing during manufacture, compared to spherical lens and complicated non-spherical lenses. Such graded refractive index lenses work as lenses, for example, converging light, because the interior of the rod glass has a continuous refractive index distribution in the radial direction from the center.

To produce such graded refractive index lenses, ion exchange methods, double crucible methods, CVD methods (vapor-phase deposition methods), sol-gel methods, rod-in-tube methods, and like methods are known as techniques for forming a graded refractive index distribution in the radial direction of a glass rod. Among these, ion exchange is the most typical method for producing a graded refractive index lens, and comprises immersing a homogeneous glass rod in a molten salt containing a monovalent cation (e.g., $K^+$, $Tl^+$, $Ag^+$) to exchange a monovalent cation in the glass (e.g., $Na^+$) for the monovalent cation in the molten salt, thereby forming a graded refractive index distribution. For example, Patent Document 1 discloses a method of producing a graded refractive index lens comprising subjecting a Na-containing glass rod to ion exchange using a molten salt containing $Ag^+$ to form a graded reflective index distribution in the radial direction of the rod.

Further, microlens arrays comprising arrays of lenses with a diameter of about several tens of micrometers to submillimeter, each lens having a graded refractive index distribution formed by subjecting a planer glass to ion exchange, are being used as computer board connectors or light source collimaters.

Optical elements produced by forming such a graded refractive index distribution include optical waveguides. Known methods for forming optical waveguides include thin film deposition methods. Thin film deposition is a method of depositing an optical waveguide layer having silica as a principal component on a substrate made of silicon, etc. More specifically, sputtering methods, CVD methods, flame deposition methods, and the like are known. Disadvantageously, all these methods need high vacuum equipment for the production of waveguides and use complicated production processes, therefore resulting in increased costs. Moreover, in CVD methods and flame deposition methods, in some cases, hazardous gases, such as $SiH_4$, $SiCl_4$ and the like are used, entailing high costs. Furthermore, flame deposition methods have disadvantages in that exposure to the high temperatures of about 1200° C. to about 1300° C. in the production process tends to degrade the substrate, and in addition, causes internal stress in the substrate, increasing the polarization dependence of guided light, as well as other problems.

Other known methods for forming optical waveguides include ion exchange methods. Ion exchange methods use a multi-component glass containing $Na^+$ ions as a substrate and comprise the step of immersing the glass substrate in a molten salt containing $K^+$ ions, $Tl^+$ ions, $Ag^+$ ions or the like to exchange $Na^+$ ions in the glass for $K^+$ ions, $Tl^+$ ions, $Ag^+$ ions or the like in the molten salt. In such an ion exchange method, an electric field may be applied during ion exchange so as to increase the ion exchange rate, ion diffusion rate, etc. Ion exchange methods can increase the refractive index of the portion where ion exchange has been carried out, forming an optical waveguide layer.

Unlike thin film deposition methods, ion exchange methods do not require high vacuum, and the temperature of the molten salt is usually in the range of about 250° C. to about 400° C. Thus the production facilities are low-cost. However, it is necessary to strictly control the composition, temperature, etc. of the molten salt, which influence the rate of ion exchange, the rate of ion diffusion into the glass substrate, etc. Moreover, the temperature at which ion exchange is conducted is influenced by the melting point of the molten salt. Therefore, when producing an optical waveguide having a desired refractive index profile by an ion exchange method using a molten salt, a high level of expertise is needed in the determination of ion exchange conditions such as the composition and temperature of the molten salt, processing time, etc. When performing ion exchange using a molten salt, it is necessary to apply an ion exchange-blocking film to the entire substrate except for the portion where ion exchange is to be performed. Photolithography is generally used to apply an ion exchange-blocking film, but formation of such a blocking film requires a complicated production process. Furthermore, when ions which are prone to oxidation in air are used as the ions to be introduced, ion exchange needs to be performed in a reducing atmosphere.

Patent Document 1: Japanese Unexamined Patent Publication No. 2001-159702

DISCLOSURE OF THE INVENTION

Problems to be Solved by the Invention

A primary object of the present invention is to provide a process for producing an optical element without the need for high vacuum, unlike the thin film deposition methods, and without using a molten salt.

Means for Solving the Problem

The present inventors carried out extensive research to achieve the above object. As a result, it was found that when using a production process comprising diffusing $Li^+$ ions, $K^+$ ions, $Rb^+$ ions, $Cs^+$ ions, $Ag^+$ ions, $Tl^+$ ions, or the like into a glass substrate using a specific paste containing at least one compound selected from lithium compounds, potassium compounds, rubidium compounds, cesium compounds, silver compounds, and thallium compounds to form a different refractive index region in the glass substrate, the above object can be achieved. The present invention has been accomplished based on this finding.

More specifically, the present invention relates to the following processes for producing graded refractive index optical elements.

1. A process for producing an optical element comprising applying a paste containing at least one compound selected from lithium compounds, potassium compounds, rubidium compounds, cesium compounds, silver compounds, and thallium compounds, an organic resin, and an organic solvent to a glass substrate containing an alkali metal component as a glass component and then performing heat treatment at a temperature below the softening temperature of the glass substrate.
2. The process according to item 1 wherein the glass substrate is made of a glass containing at least 2% by weight of an alkali metal, calculated on an oxide basis, the glass being a silicate glass, borosilicate glass, phosphate glass, or fluorophosphate glass.
3. An optical element produced by the process of item 1 or 2.
4. The optical element according to item 3 which is a graded refractive index lens, a graded refractive index lens array, an optical waveguide, or a diffraction grating.
5. The optical element according to item 4 which is a slab optical waveguide or a channel optical waveguide.

The process for producing an optical element of the invention is described below in detail. The graded refractive index optical element of the invention refers to an element that exhibits a desired optical property by utilizing a region formed in at least a portion of a glass substrate, the region having a refractive index different from that of the rest of the substrate or having a graded refractive index distribution. Specific examples of such optical elements include graded refractive index lenses, graded refractive index lens arrays, optical waveguides, diffraction gratings, and the like.

In the process of the invention, it is necessary to use a glass substrate containing an alkali metal component as a glass component.

Examples of the alkali metal component contained in the glass substrate include Li, Na, K, Rb, Cs, etc. Among these, Li, Na, K, etc. are preferable, and Na is particularly preferable. Such alkali metals may exist in an ionic state, or may exist as an oxide. Such alkali metals may be used singly or as a combination of two or more such metals.

The alkali metal content of the glass substrate is suitably at least about 2% by weight, preferably at least about 5% by weight, and more preferably at least about 10% by weight, calculated on an oxide basis. Although the maximum alkali metal content of the glass substrate is not particularly limited, the maximum content is suitably about 40% by weight, more preferably about 30% by weight, and even more preferably about 20% by weight, calculated on an oxide basis.

In the present invention, any glass containing an alkali metal component as described above can be used without particular limitation. For example, silicate glass, borosilicate glass, phosphate glass, fluorophosphate glass, etc. can be used.

The compositions of such glasses for use are not particularly limited. Any glass containing an alkali metal component as described above and having a known silicate glass, borosilicate glass, phosphate glass, fluorophosphate glass or like glass composition can be used without particular limitation.

Specific examples of such glass compositions include the following compositions shown in 1) to 4), calculated on an oxide basis:

1) silicate glass containing 40 to 80% by weight, and preferably 50 to 75% by weight, of $SiO_2$; 5 to 25% by weight, and preferably 17 to 20% by weight, of CaO; 5 to 25% by weight, and preferably 7 to 20% by weight, of at least one member selected from $Na_2O$, $K_2O$, $Li_2O$, $Rb_2O$ and $Cs_2O$; not more than 2% by weight, and preferably not more than 1.5% by weight, of at least one member selected from MgO, BaO, ZnO, SrO and PbO (the minimum amount is preferably about 0.1% by weight to fully achieve the desired effects); not more than 15% by weight, and preferably not more than 10% by weight, of $Al_2O_3$ (the minimum amount is preferably about 0.5% by weight to fully achieve the desired effects); and not more than 3% by weight, and preferably not more than 1% by weight, of at least one member selected from $Fe_2O_3$ and $SO_3$ (the minimum amount is preferably about 0.05% by weight to fully achieve the desired effect);

2) borosilicate glass containing 20 to 80% by weight, and preferably 30 to 75% by weight, of $SiO_2$; 3 to 50% by weight, and preferably 5 to 30% by weight, of $B_2O_3$; 2 to 20% by weight, and preferably 5 to 15% by weight, of at least one member selected from the group consisting of $Na_2O$, $K_2O$, $Li_2O$, $Rb_2O$ and $Cs_2O$; not more than 30% by weight, and preferably not more than 25% by weight, of at least one member selected from MgO, CaO, BaO, ZnO, SrO and PbO (the minimum amount is preferably about 1% by weight to fully achieve the desired effects), not more than 15% by weight, and preferably not more than 10% by weight, of at least one member selected from $Al_2O_3$, $La_2O_3$, $Y_2O_3$, $Ta_2O_3$ and $Gd_2O_3$ (the minimum amount is preferably about 0.5% by weight to fully achieve the desired effects); not more than 2% by weight, and preferably not more than 1% by weight, of at least one member selected from the group consisting of $Nb_2O_5$ and $ZrO_2$ (the minimum amount is preferably about 0.05% by weight to fully achieve the desired effects); and not more than 2% by weight, and preferably not more than 1% by weight, of at least one member selected from $As_2O_3$, $Sb_2O_3$ and SnO (the minimum amount is preferably about 0.01% by weight to fully achieve the desired effects);

3) phosphate glass containing 40 to 80% by weight, and preferably 50 to 75% by weight, of $P_2O_5$; not more than 20% by weight, and preferably not more than 10% by weight of, $SiO_2$ (the minimum amount is preferably about 0.5% by weight to fully achieve the desired effects); 2 to 20% by weight, and preferably 5 to 15% by weight, of at least one member selected from $Na_2O$, $K_2O$, $Li_2O$, $Rb_2O$ and $Cs_2O$; 2 to 50% by weight, and preferably 5 to 45% by weight, of at least one member selected from MgO, CaO, BaO, ZnO, SrO and PbO; not more than 15% by weight, and preferably not more than 10% by weight, of at least one member selected from $B_2O_3$, $Al_2O_3$, $La_2O_3$, $Y_2O_3$, $Ta_2O_3$, $Nd_2O_3$ and $Gd_2O_3$ (the minimum amount is preferably about 0.5% by weight to fully achieve the desired effects); and not more than 2% by weight, and preferably not more than 1% by weight, of at least one member selected from $Nb_2O_5$ and $ZrO_2$ (the minimum amount is preferably about 0.01% by weight to fully achieve the desired effects); and 4) fluorophosphates glass obtained by substitution of F (fluorine) for some of the O (oxygen) of an original composition containing 20 to 50% by weight, and preferably 30 to 40% by weight, of $P_2O_5$; 5 to 30% by weight, and preferably 10 to 25%, of $Al_2O_3$; 2 to 20% by weight, and preferably 5 to 15% by weight, of at least one member selected from $Na_2O$, $K_2O$, $Li_2O$, $Rb_2O$ and $Cs_2O$; 10 to 50% by weight, and preferably 20 to 40% by weight, of at least one member selected from MgO, CaO, BaO, ZnO and SrO.

The form of such glass substrates is not particularly limited and can be suitably determined according to the purpose of the final product. For example, a wide variety of forms suitable for lenses, lens arrays, optical waveguides, diffraction gratings, etc. can be used, and specific examples thereof are plates, cylindrical columns, rectangular columns, and the like. For example, substrates formed into a desired shape by grinding a mass of glass having a composition as described above, and substrates formed by molding a molten glass into a desired shape and then optionally polishing may be used.

The process of the present invention comprises applying a paste containing at least one compound selected from lithium compounds, potassium compounds, rubidium compounds, cesium compounds, silver compounds, and thallium compounds to a glass substrate containing an alkali metal component as a glass component, and performing heat treatment at a temperature below the softening temperature of the glass substrate. Such compounds are hereinafter also referred to as "metal compounds".

The paste for use is one obtained by dispersing an organic resin and at least one compound selected from lithium compounds, potassium compounds, rubidium compounds, cesium compounds, silver compounds, and thallium compounds in an organic solvent. Any such paste can be used as long as the paste has a viscosity that allows its application to a glass substrate and it contains a metal compound as mentioned above, which is capable of diffusing at least one member selected from lithium ions, potassium ions, rubidium ions, cesium ions, silver ions, and thallium ions by heat treatment. More specifically, the paste viscosity can be suitably determined in consideration of the application method, paste composition, conditions of diffusion into the substrate, etc.

The metal ion(s) in the metal compound(s) contained in the paste are diffused into the glass substrate as $Li^+$ ions, $K^+$ ions, $Rb^+$ ions, $Cs^+$ ions, $Ag^+$ ions, $Tl^+$ ions, etc. by ion exchange with an alkali metal component of the glass substrate by applying such a paste to the glass substrate and performing heat treatment. The portion containing such diffused ions has a refractive index different from that of the rest of the glass substrate, the refractive index having a continuous distribution that varies according to the concentration of diffused ions. In particular, when $Ag^+$ ions, $Tl^+$ ions, etc. are diffused, a desired refractive index distribution can be easily obtained because the potential refractive index range is wide, thus being preferable. The metal compound contained in the paste is not particularly limited as long as it is an ionic metal compound capable of diffusing metal ions into a glass substrate by heat treatment. Inorganic salts are particularly preferable. Specific examples of metal compounds are described below.

Examples of lithium compounds include $LiNO_3$, $LiCl$, $LiBr$, $LiI$, $LiF$, and $Li_2SO_4$, and the like. Among these, $LiNO_3$, $Li_2SO_4$, and the like are particularly preferable.

Examples of potassium compounds include $KNO_3$, $KCl$, $KBr$, $KI$, $KF$, $K_2SO_4$, and the like. Among these, $KNO_3$, $K_2SO_4$, and the like are particularly preferable.

Examples of rubidium compounds include $RbNO_3$, $RbCl$, $RbBr$, $RbI$, $RbF$, $Rb_2SO_4$, and the like. Among these, $RbNO_3$, $Rb_2SO_4$, and the like are particularly preferable.

Examples of cesium compounds include $CsNO_3$, $CsCl$, $CsBr$, $CsI$, $CsF$, $Cs_2SO_4$, and the like. Among these, $CsNO_3$, $Cs_2SO_4$, and the like are particularly preferable.

Examples of silver compounds include $AgNO_3$, $AgCl$, $AgBr$, $AgI$, $AgF$, $Ag_2S$, $Ag_2SO_4$, $Ag_2O$ and the like. Among these, $AgNO_3$ is particularly preferable.

Examples of thallium compounds include $TlNO_3$, $TlCl$, $TlBr$, $TlI$, $TlF$, $Tl_2S$, $Tl_2SO_4$, $Tl_2O$ and the like. Among these, $TlNO_3$ is particularly preferable.

Such metal compounds can be used singly or as a combination of two or more.

The organic resin to be contained in the paste is one that decomposes at the heat treatment temperature. Resins that are easily removable by washing with water are preferably used. Examples of such resins include cellulose resins, methyl cellulose resins, cellulose acetate resins, cellulose nitrate resins, cellulose acetate butyrate resins, acrylic resins, petroleum resins, etc. Such organic resins can be used singly or as a combination of two or more such resins.

The organic solvent used in the paste is preferably a solvent in which a metal compound and an organic resin can be easily dispersed and which easily volatilizes when dried. More specifically, a solvent that is a liquid at room temperature (about 20° C.) and volatilizes at a temperature of about 50° C. to about 200° C. is preferable. Examples of such solvents include alcohols such as methanol, ethanol, terpineol, etc.; dimethyl ether; ketones such as acetone, etc.; and so on.

If necessary, additives may be added to the paste. For example, $Na_2SO_4$, $NaNO_3$, $NaCl$, $NaBr$, $NaI$, etc. can be used as additives to lower the melting point of the metal compound. Among these, at least one compound selected from $Na_2SO_4$ and $NaNO_3$ is particularly preferable. Although the amount of such additives is not particularly limited, it is usually not more than 200 parts by weight, and preferably not more than 180 parts by weight, per 100 parts by weight of metal compound.

The content of each component in the paste can be suitably determined according to the purpose of the final product. For example, when the metal compound is a potassium compound, a rubidium compound, or a cesium compound, the amount of organic solvent is usually 2 to 25 parts by weight, and preferably 5 to 20 parts by weight; the amount of resin component is usually 15 to 45 parts by weight, and preferably 20 to 40 parts by weight; and the amount of additive is usually not more than 3 parts by weight; per 100 parts by weight of metal compound. In particular, when $KNO_3$ is used as a potassium compound, $RbNO_3$ is used as a rubidium compound, or $CsNO_3$ is used as a cesium compound, the above proportions are preferable.

When the metal compound is a silver compound or a thallium compound, the amount of organic solvent is usually 15 to 45 parts by weight, and preferably 20 to 40 parts by weight; the amount of resin component is usually 50 to 170 parts by weight, and preferably 70 to 150 parts by weight; the amount of additive is usually not more than 180 parts by weight, and preferably 160 parts by weight; per 100 parts by weight of metal compound. In particular, when $AgNO_3$ is used as a silver compound or $TlNO_3$ is used as a thallium compound, the above proportions are preferable.

When the metal compound is a lithium compound, the amount of organic solvent is usually 10 to 50 parts by weight, and preferably 15 to 45 parts by weight; the amount of resin component is usually 40 to 180 parts by weight, and preferably 60 to 160 parts by weight; the amount of additive is usually not more than 180 parts by weight, and preferably 160 parts by weight; per 100 parts by weight of metal compound. In particular, when $Li_2SO_4$ is used as a lithium compound, the above proportions are preferable.

In the process of the present invention, a paste is first applied to a glass substrate. The shape of the applied paste is not particularly limited and can be suitably determined according to the properties of the optical element. For example, when a refractive index lens is produced, the paste may be applied to a desired portion of the substrate to form a shape usable as the lens. More specifically, when the paste is applied as circle(s), the radius of the circle(s) is usually about 5 μm to about 1 mm, and preferably about 10 μm to about 0.5 mm. When a lens array is produced, the patterning interval, circle or dot size, etc., can be suitably adjusted according to the desired lens pattern. Although the patterning interval is not particularly limited, it is usually 1 cm or less, preferably 500 μm or less, more preferably 250 μm or less.

The method of application is not particularly limited, and known application methods are suitable. For example, methods such as spin coating, spray coating, dip coating, etc. can be used. When a graded refractive index microlens is produced, the paste may be applied dropwise to the substrate using a syringe, dispensing pipette, or the like, or printing techniques for forming precise circular microdots (for example, ink-jet printing) may be used.

When an optical waveguide or diffraction grating is produced, linear patterning may be used. For linear patterning, screen printing as used in dyeing, etc. may be used. When forming a linear pattern, the line width may be suitably determined according to the desired properties of the optical element (e.g., optical waveguide, diffraction grating, etc.). When producing an optical waveguide, the line width is usually 100 μm or less, preferably 50 μm or less, and more preferably 30 μm or less. When producing a diffraction grating, the line width is usually 500 μM or less, preferably 200 μm or less, and more preferably 100 μm or less. To form a very precise pattern, a process comprising patterning a glass substrate surface using an inorganic film according to a photolithography method and then applying a paste containing a metal compound to the exposed portion of the glass substrate may be used.

A process of forming a channel optical waveguide, the process comprising patterning a glass substrate surface using an inorganic film according to a photolithographic method, applying a paste containing a metal compound to the exposed portion of the glass substrate and then heat-treating, is briefly described below as one example of a process for forming an optical waveguide.

First, a metal such as Al, Ti, Ag, etc. or an oxide such as $SiO_2$, etc. is deposited on a glass substrate by vapor deposition to form an inorganic film. Although the thickness of the deposited inorganic film is not particularly limited, the film is preferably formed to a thickness of about 0.25 μm to about 1 μm, and more preferably about 0.25 μm to about 0.5 μm. After depositing the inorganic film, a photoresist is applied to the film. Commercially available organic photoresists can be used as such photoresists. The method of application is not particularly limited, and methods such as spin coating, spray coating, dip coating, etc. can be used. A patterned metal sheet is then placed over the photoresist, and a pattern is formed by exposure to ultraviolet light and development of the photoresist. Subsequently, the inorganic film of the portion to be exposed is removed by etching, etc. in accordance with the pattern and the photoresist is removed, so that a patterned film is formed by the inorganic film on the surface of the glass substrate. A paste containing a metal compound is then applied thereon to the exposed portion of the glass substrate and heat treatment is performed (the heat treatment conditions are described later), so that a channel optical waveguide can be formed.

As another form of optical element, a slab optical waveguide can be formed by applying a paste over the entire glass substrate and performing heat treatment.

In all the above paste application methods, the thickness of the applied paste is not particularly limited and can be suitably determined according to the type, amount, etc. of metal compound contained in the paste. However, the thickness is usually not more than 2 mm, particularly not more than 1.5 mm, and particularly preferably not more than 1 mm.

After applying the paste, the resulting coating film is usually dried prior to heat treatment. The drying conditions are not particularly limited as long as the film is dried so that the solvent component is sufficiently removed and the paste is dried to a solid. Usually, the coating film can be efficiently dried by heating at a temperature of about 100° C. to about 250° C. for about 30 minutes to about 1.5 hours, and preferably at a temperature of about 150° C. to about 200° C. for about 45 minutes to about 1 hour.

Subsequently, the dried coating film is heat-treated. The heat treatment temperature is usually in the range of about 250° C. to about 600° C., and preferably in the range of about 300° C. to about 550° C., being set at a temperature below the softening temperature of the glass substrate. Although the heat treatment time can be suitably determined according to the temperature, it is usually about 10 minutes to about 100 hours, preferably about 30 minutes to about 50 hours, and particularly preferably about 1 to 25 hours. The heat treatment atmosphere is usually an oxygen-containing atmosphere, such as in air.

Heat treatment by the above-mentioned method allows metal ions to diffuse into the glass substrate. The diffused metal ions exist as metal ions, metal oxide, metal fine particles, etc., depending on the treatment conditions. As a result, the portion containing such dispersed metal ions differs in refractive index from the rest of the glass substrate. The refractive index distribution is continuous. Usually, the substrate surface to which the paste has been applied has the greatest refractive index. The greater the diffusion depth, the lower is the refractive index. For example, when the paste is applied as circle(s), the refractive index decreases continuously in the radial direction from the center of the circle. An element with a suitable refractive index distribution capable of exhibiting specific optical properties can be obtained by forming such a refractive index distribution different from that of the rest of the substrate or forming a region with a graded refractive index distribution.

After heat treatment, the substrate is usually allowed to cool to room temperature, and the paste residue remaining on the substrate is washed away with water.

Of course, the method of the invention is useful not only for producing the optical elements specifically described above but also for producing other elements capable of optically utilizing a refractive index change or refractive index distribution provided in a substrate.

Effect of the Invention

According to the method of the invention, by simply applying a paste containing a specific metal compound to a glass substrate containing an alkali metal component and heating in an atmosphere such as air, a region having a refractive index different from that of the rest of a glass substrate or a graded refractive index distribution can be formed in a desired portion of the glass substrate to produce an optical element capable of utilizing such a refractive index difference or graded refractive index distribution. This method is capable of producing an optical element at low cost without a complicated production process.

Moreover, since the method does not use a molten salt, strict control of a molten salt is not needed, and the heat treatment temperature and the metal compound concentration in the paste can be controlled independently. Furthermore, unlike immersion in a molten salt, since the paste is applied to a desired portion of the substrate, it is unnecessary to mask the substrate surface with a blocking film, etc.

BRIEF DESCRIPTION OF THE DRAWINGS

In FIG. 1, (a) shows the starting point of the waveguide, and (b) shows the terminal points of the waveguide.

BEST MODE FOR CARRYING OUT THE INVENTION

The present invention is described in further detail with reference to the following Examples. However, the present invention is not limited to the Examples.

Example 1

Production of a Graded Refractive Index Y-Shaped Optical Waveguide

Using a commercially available $SiO_2$—$B_2O_3$—$Na_2O$ borosilicate glass (product number: BK7, manufactured by Schott) as a substrate (20 mm long×20 mm wide×3 mm thick), an optical waveguide was formed according to the following method.

The glass substrate was first washed and then a paste of 25% by weight of $AgNO_3$, 40% by weight of $NaNO_3$, 15% by weight of acrylic resin, 15% by weight of cellulose resin, and 5% by weight of terpineol (the paste being prepared by mixing 20 parts by weight of organic solvent, 120 parts by weight of resin component, and 160 parts by weight of additive per 100 parts by weight of silver compound) was applied by screenprinting to one side of the glass substrate to form a Y shape (line width: 100 μm) to a thickness of 1 mm.

Subsequently, the pasted glass substrate was dried at 200° C. for 1 hour and then heat-treated in air at 300° C. for 3 hours.

Figure 1:
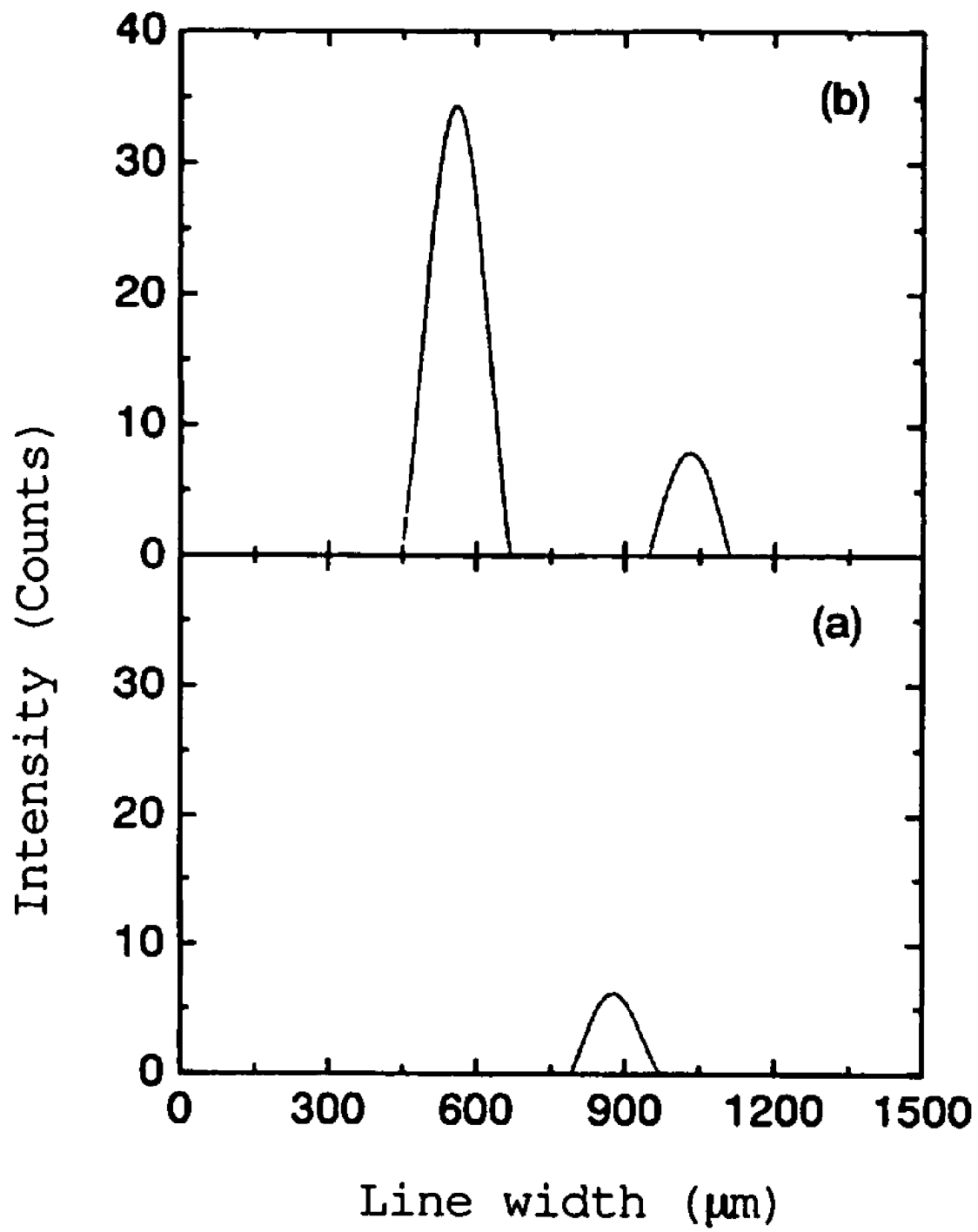
FIG. 1 is a graph showing the distribution of silver in the Y-shaped optical waveguide produced in Example 1.

The silver distribution in the heat-treated sample was determined using an EDX (energy dispersive X-ray analyzer), and it was confirmed that silver was distributed along the Y-shaped lines. FIG. 1 shows the silver distribution measurement results. In FIG. 1, (a) shows the starting point of the waveguide, and (b) shows the terminal points of the waveguide. In Example 1, the starting point is the lower end of the Y, and the terminal points are the two upper ends of the Y.

Figure 2:
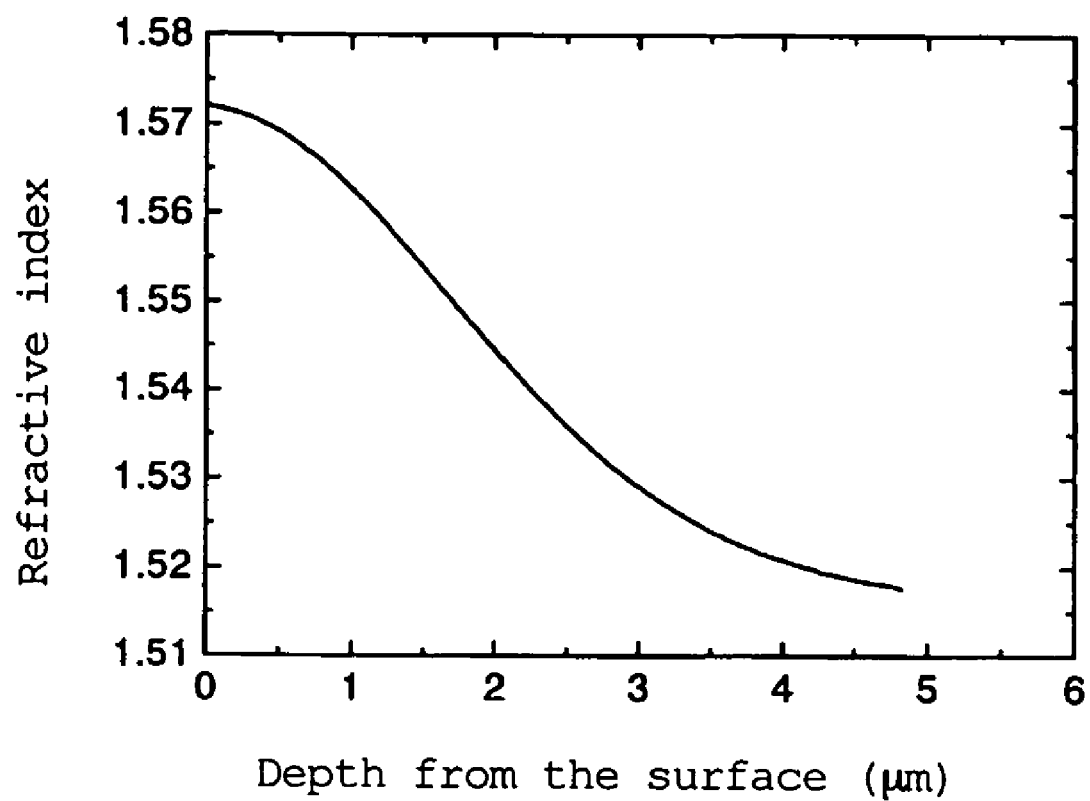
FIG. 2 is a graph showing the refractive index distribution in the depth direction of the Y-shaped waveguide produced in Example 1.

The refractive index distribution in the depth direction of the glass substrate was also examined, and the results show that the maximum refractive index difference from the glass substrate was about $5×10^{-2}$ and the refractive index distribution extended to a depth of about 4 μm from the surface. FIG. 2 shows the results of refractive index distribution measurement in the depth direction.

Figure 3:
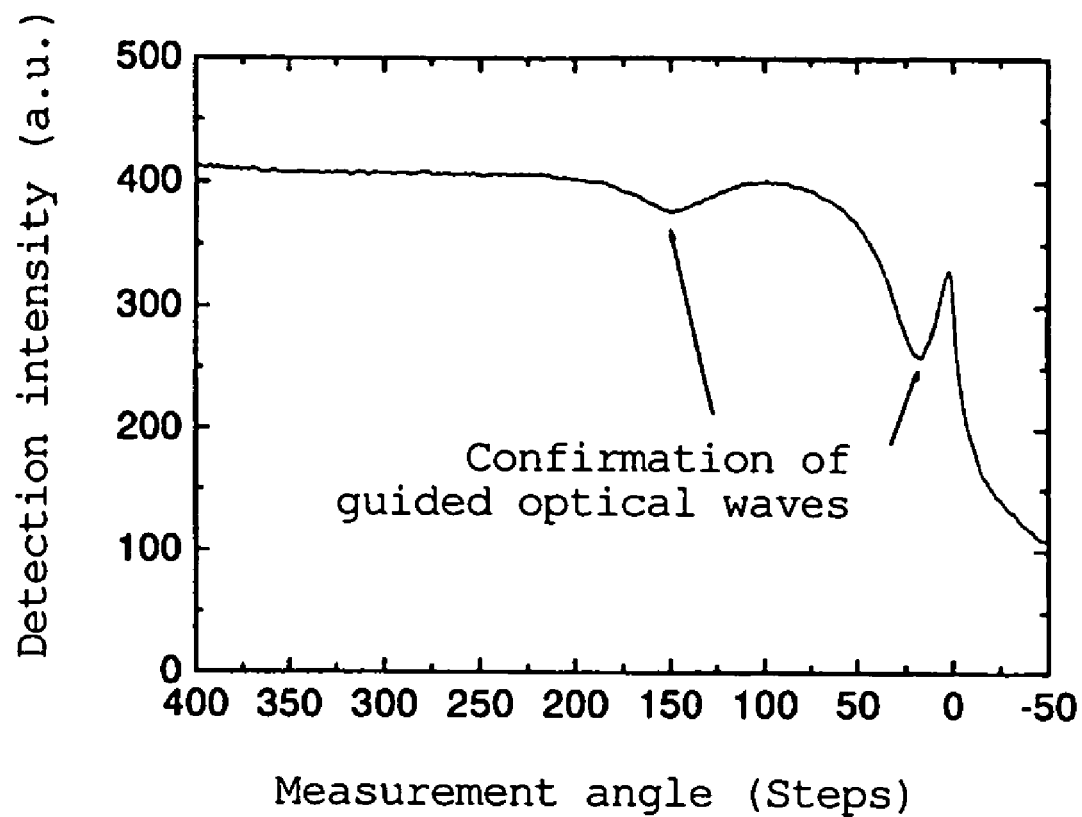
FIG. 3 is a graph showing the results of prism reflection intensity measurements which confirm that the slab optical wavelength produced in Example 1 guides light.

A slab optical waveguide was also produced according to the above method. The reflection intensity of the obtained glass surface was determined by the prism coupling method, and it was confirmed that light was guided. FIG. 3 shows the relationship between the measurement angle and the detection intensity.

Example 2

Production of a Graded Refractive Index Microlens

Using a commercially available $SiO_2$—$CaO$—$Na_2O$ silicate glass (product number: B270, manufactured by Schott) as a substrate (20 mm long×20 mm wide×3 mm thick), a microlens was formed according to the following method.

The glass substrate was first washed and then a paste of 25% by weight of $AgNO_3$, 40% by weight of $NaNO_3$, 15% by weight of acrylic resin, 15% by weight of cellulose resin, and 5% by weight of terpineol (the paste being prepared by mixing 20 parts by weight of organic solvent, 120 parts by weight of resin component, and 160 parts by weight of additive per 100 parts by weight of silver compound) was applied dropwise using a syringe to one side of the glass substrate to form a circle (diameter: 400 μm) to a thickness of 1 mm.

Subsequently, the pasted glass substrate was dried at 200° C. for 1 hour and then heat-treated in air at 300° C. for 3 hours.

Figure 4:
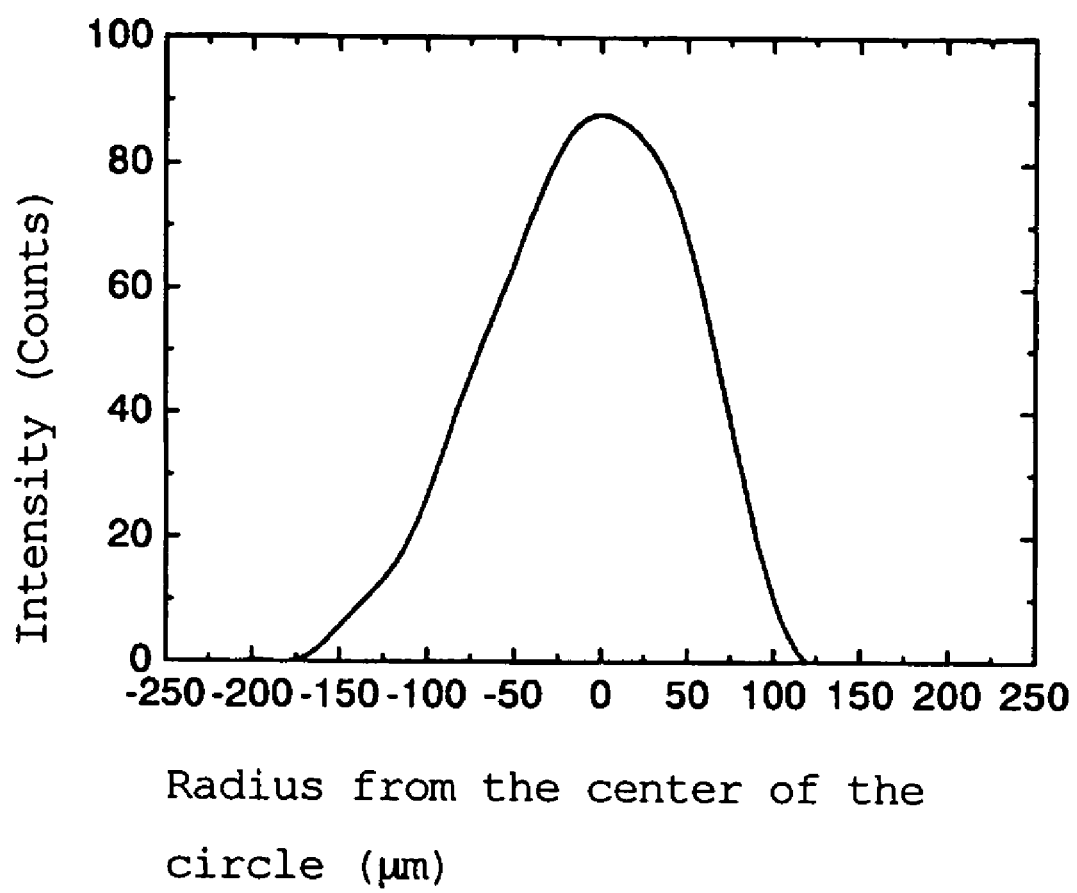
FIG. 4 is a graph showing the silver distribution (at the surface layer portion) in the microlens produced in Example 2.

The silver distribution in the heat-treated sample was determined using an EDX (energy dispersive X-ray analyzer), and it was confirmed that silver was radially distributed. FIG. 4 shows the silver distribution measurement results. The silver distribution was determined by measuring the distribution of silver at the paste-applied surface (i.e., outer layer surface of the glass).

Figure 5:
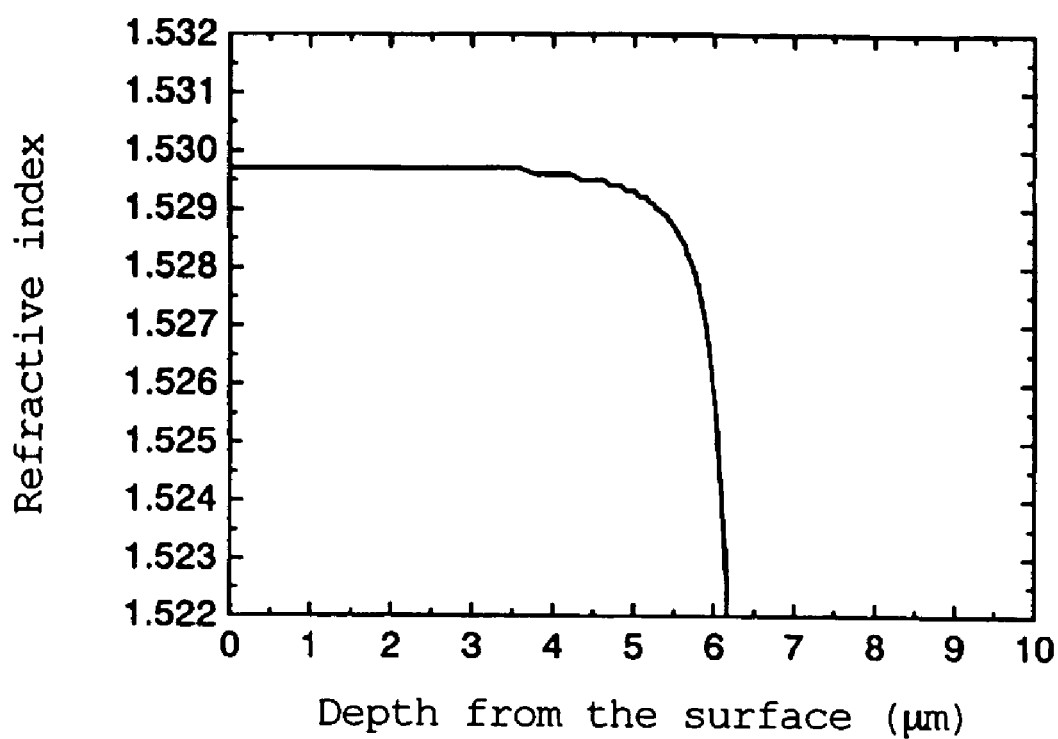
FIG. 5 is a graph showing the refractive index distribution in the depth direction of the microlens produced in Example 2.

The refractive index distribution in the depth direction of the glass substrate was also examined, and the results show that the maximum refractive index difference from the glass substrate was about $1×10^{-2}$ and the refractive index distribution extended to a depth of about 6 μm from the surface, at the center of the paste-applied circle. FIG. 5 shows a refractive index distribution in the depth direction (at the center of the circle).

Example 3

Production of a Graded Refractive Index Microlens Array

Using a glass of 54 wt. % of $SiO_2$, 22 wt. % of $B_2O_3$, 12 wt. % of the total weight of $Li_2O$, $Na_2O$ and $K_2O$, 10 wt. % of $Al_2O_3$, and 2 wt. % of ZnO as a substrate (10 mm long×10 mm wide×3 mm thick), a graded refractive index microlens array was formed according to the following method.

Figure 6:
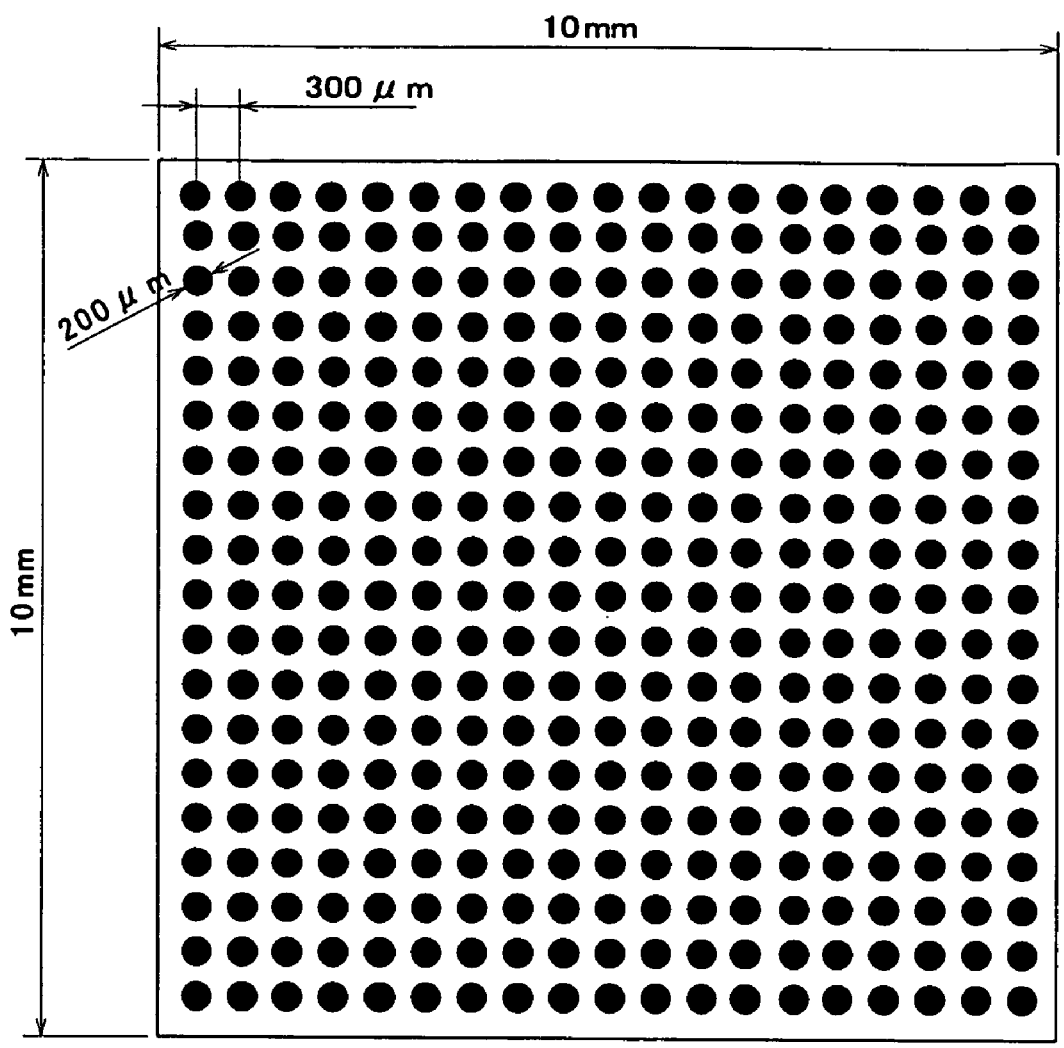
FIG. 6 is a pattern diagram of the paste pattern used in the production of the microlens array of Example 3. The diameter of the paste-applied circles is 200 μm, and the patterning interval between the paste-applied circles is 300 μM.

The glass substrate was first washed and then a paste of 25% by weight of $AgNO_3$, 40% by weight of $NaNO_3$, 15% by weight of acrylic resin, 15% by weight of cellulose resin, and 5% by weight of terpineol (the paste being prepared by mixing 20 parts by weight of organic solvent, 120 parts by weight of resin component, and 160 parts by weight of additive per 100 parts by weight of silver compound) was applied dropwise using a dispensing pipette to one side of the glass substrate to form 20 by 20 circles (diameter: 200 μm, total 400 dots) with a patterning interval (distance from the center of one circle to the center of the adjacent circle) of 300 μm to a thickness of 0.2 mm. FIG. 6 is a pattern diagram showing the pattern.

Subsequently, the pasted glass substrate was dried at 200° C. for 1 hour and then heat-treated in air at 300° C. for 12 hours.

Figure 7:
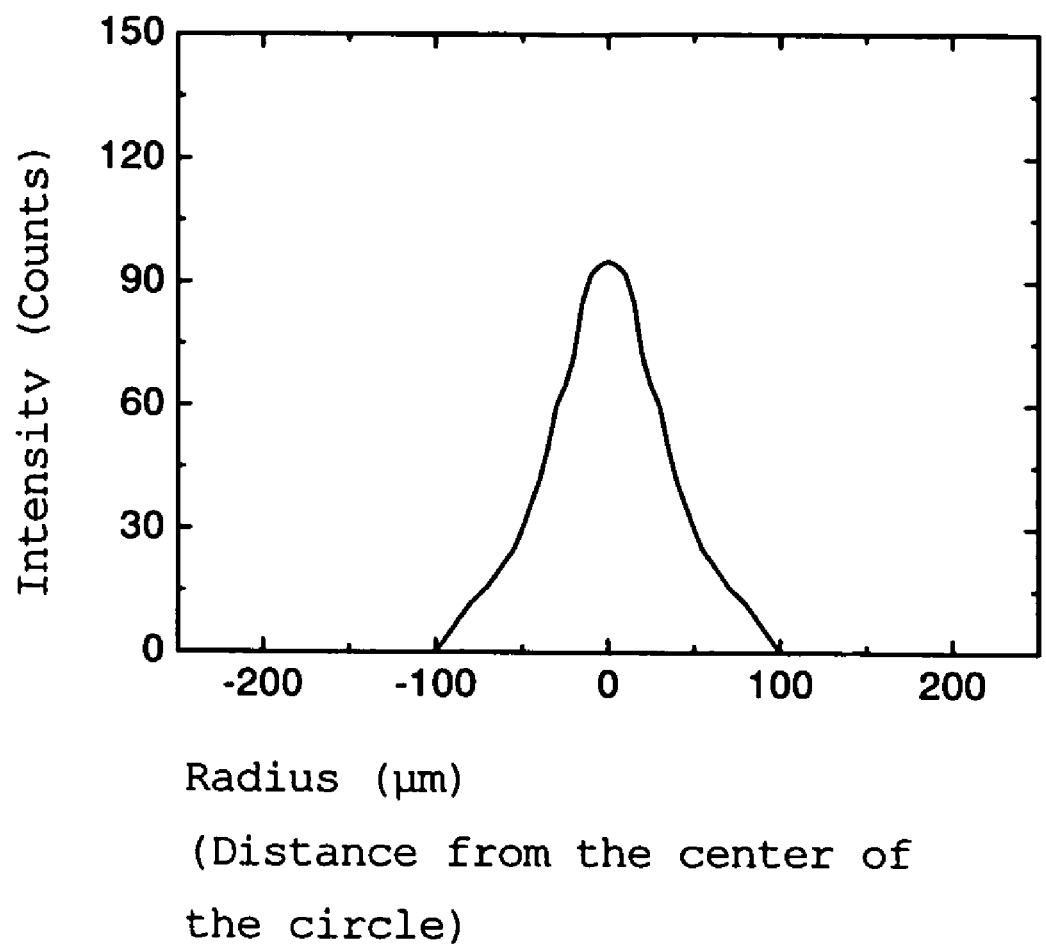
FIG. 7 is a graph showing the silver distribution (at the surface layer portion) in one microlens of the microlens array produced in Example 3.

The silver distribution in the heat-treated sample was determined using an EDX (energy dispersive X-ray analyzer), and it was confirmed that silver was radially distributed. FIG. 7 shows the silver distribution measurement results. The silver distribution was determined by measuring the distribution of silver at the paste-applied surface (i.e., outer layer surface of the glass).

Figure 8:
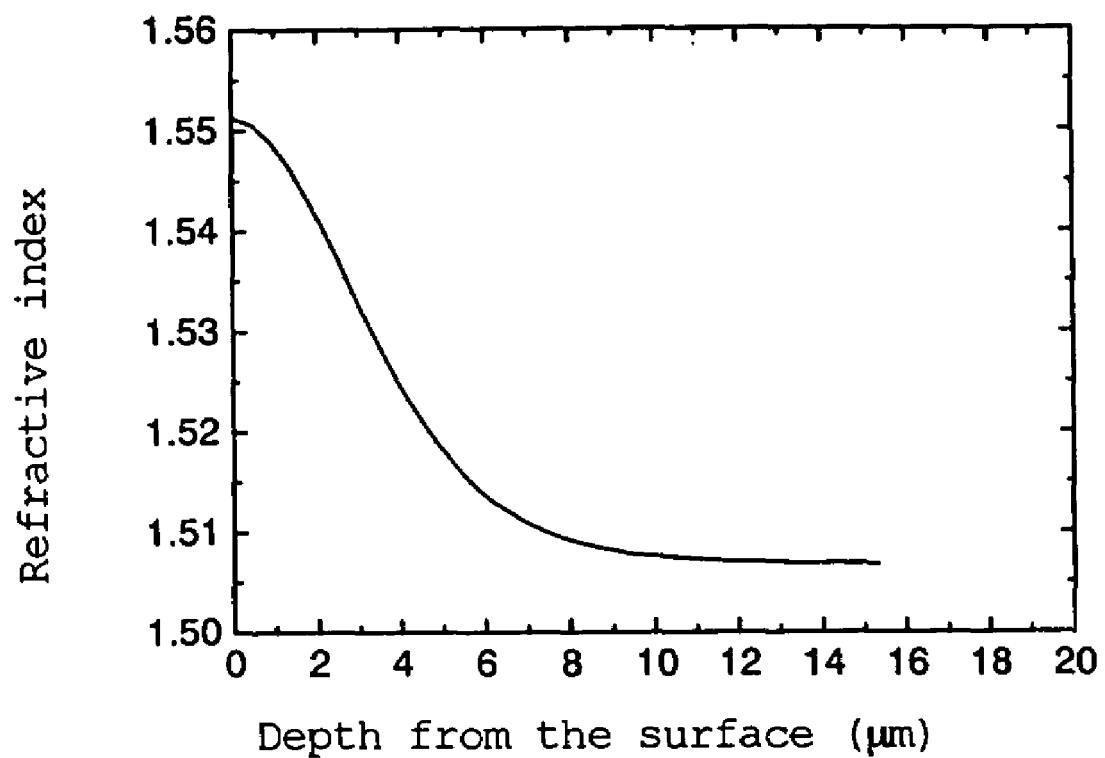
FIG. 8 is a graph showing the refractive index distribution (at the center of the paste-applied circle) in the depth direction of one microlens of the microlens array produced in Example 3.

The refractive index distribution in the depth direction of the glass substrate was also examined, and it was revealed that the maximum refractive index difference from the glass substrate was about $4\times10^{-2}$ and the refractive index distribution extended to a depth of about 15 μm from the surface, at the center of one paste-applied circle. FIG. 8 shows the refractive index distribution in the depth direction (at the center of the circle).

The invention claimed is:

1. A method of producing an optical element comprising applying a paste containing at least one compound selected from lithium compounds, potassium compounds, rubidium compounds, cesium compounds, silver compounds, and thallium compounds; an organic resin; and an organic solvent to a glass substrate containing an alkali metal component as a glass component and then performing heat treatment at a temperature below the softening temperature of the glass substrate, whereby the metal ions in the metal compounds contained in the paste are diffused into the glass substrate as at least one of $Li^+$ ions, $K^+$ ions, $Rb^+$ ions, $Cs^+$ ions, $Ag^+$ ions, and $Tl^+$ ions, by ion exchange with the alkali metal component of the glass substrate.

2. The method according to claim 1 wherein the glass substrate is made of a glass containing at least 2% by weight of alkali metal, calculated on an oxide basis, the glass being a silicate glass, borosilicate glass, phosphate glass, or fluorophosphate glass.

3. An optical element produced by the method of claim 1.

4. The optical element according to claim 3 which is a graded refractive index lens, a graded refractive index lens array, an optical waveguide, or a diffraction grating.

5. The optical element according to claim 4 which is a slab optical waveguide or a channel optical waveguide.

6. An optical element produced by the method of claim 2.

7. The optical element according to claim 6 which is a graded refractive index lens, a graded refractive index lens array, an optical waveguide, or a diffraction grating.

8. The optical element according to claim 7 which is a slab optical waveguide or a channel optical waveguide.

* * * * *